(12) United States Patent
Drenguis et al.

(10) Patent No.: US 10,457,426 B2
(45) Date of Patent: Oct. 29, 2019

(54) METHOD AND DEVICE FOR PRODUCING FILLED CONTAINERS MADE FROM PREFORMS

(75) Inventors: Alfred Drenguis, Börnsen (DE); Dieter Klatt, Hamburg (DE)

(73) Assignees: KHS GMBH, Dortmund (DE); KHS CORPOPLAST GMBH, Hamburg (DE)

( * ) Notice: Subject to any disclaimer, the term of this patent is extended or adjusted under 35 U.S.C. 154(b) by 850 days.

(21) Appl. No.: 14/118,821

(22) PCT Filed: Apr. 17, 2012

(86) PCT No.: PCT/EP2012/001645
§ 371 (c)(1),
(2), (4) Date: Mar. 11, 2014

(87) PCT Pub. No.: WO2012/156041
PCT Pub. Date: Nov. 22, 2012

(65) Prior Publication Data
US 2014/0174034 A1    Jun. 26, 2014

(30) Foreign Application Priority Data
May 19, 2011   (DE) .................. 10 2011 102 056

(51) Int. Cl.
*B29C 49/00* (2006.01)
*B65B 3/02* (2006.01)

(52) U.S. Cl.
CPC .................. *B65B 3/022* (2013.01)

(58) Field of Classification Search
CPC ......... B65B 3/022; B29C 49/06; B29C 49/12; B29C 49/42; B29C 49/46

USPC .................... 53/452, 572; 264/500, 523, 532
See application file for complete search history.

(56) References Cited

U.S. PATENT DOCUMENTS

| 4,076,071 | A   | 2/1978 | Rosenkranz et al. |
|-----------|-----|--------|-------------------|
| 5,346,386 | A   | 9/1994 | Albrecht et al.   |
| 5,648,026 | A   | 7/1997 | Weiss             |
| 6,214,282 | B1  | 4/2001 | Katou et al.      |
| 6,502,369 | B1* | 1/2003 | Andison ................ B65B 3/022 53/275 |
| 9,744,712 | B2* | 8/2017 | Letestu .................. B29C 49/06 |
| 2005/0196569 | A1 | 9/2005 | Lisch et al.    |

(Continued)

FOREIGN PATENT DOCUMENTS

| DE | 1800525 Y | 5/1970 |
| DE | 1916636   | 10/1970 |

(Continued)

*Primary Examiner* — Andrew M Tecco
*Assistant Examiner* — Eyamindae C Jallow
(74) *Attorney, Agent, or Firm* — Lucas & Mercanti, LLP; Klaus P. Stoffel (57) ABSTRACT

A method and device for producing filled containers from preforms made of a thermoplastic material. The preforms are respectively transferred to a molding or filling element of a molding and filling station and are shaped in the respective container in a subsequent molding and filling process inside a mold of the molding and filling station due to the action of the pressure of a supplied filling material in the preform. The respective container is withdrawn from the molding and filling element of the molding and filling station after molding and filling.

19 Claims, 5 Drawing Sheets

(56) References Cited

U.S. PATENT DOCUMENTS

| 2011/0037188 A1* | 2/2011 | Hirdina | B08B 9/00 |
| | | | 264/39 |
| 2011/0076432 A1* | 3/2011 | Sakaguchi | B29C 49/6472 |
| | | | 428/36.92 |
| 2011/0094616 A1* | 4/2011 | Hayakawa | B67C 3/242 |
| | | | 141/1 |

FOREIGN PATENT DOCUMENTS

| DE | 2138899 | | 2/1972 | |
| DE | 2352926 | | 4/1975 | |
| DE | 4212583 | | 10/1993 | |
| DE | 4340291 | | 6/1995 | |
| EP | 1529620 Y | | 5/2005 | |
| EP | 2987613 A1 | * | 2/2016 | B29C 33/72 |
| FR | 1430316 | | 3/1966 | |
| GB | 954473 | | 4/1964 | |
| GB | 1474044 | | 5/1977 | |
| GB | 1474044 A | * | 5/1977 | B29C 49/0005 |
| JP | 200043129 | | 8/2001 | |
| WO | 9522413 A1 | | 8/1995 | |
| WO | 2004113052 Y | | 12/2004 | |
| WO | 2005044540 | | 5/2005 | |
| WO | 2007120807 | | 10/2007 | |
| WO | WO 2007120807 A2 | * | 10/2007 | B29C 49/46 |

\* cited by examiner

METHOD AND DEVICE FOR PRODUCING FILLED CONTAINERS MADE FROM PREFORMS

The present application is a 371 of International application PCT/EP2012/001645, filed Apr. 17, 2012, which claims priority of DE 10 2011 102 056.3, filed May 19, 2011, the priority of these applications is hereby claimed and these applications are incorporated herein by reference.

BACKGROUND OF THE INVENTION

The invention concerns a method and a device for producing filled containers from preforms made of a thermoplastic material.

The manufacture of containers by blow-molding from preforms made of a thermoplastic material, for example from preforms made of PET (polyethyleneterephthalate), is known, wherein the preforms are supplied to different machining stations inside a blow-molding machine (DE-OS 43 40 291). Typically, a blow-molding machine has a heating device for the tempering or pre-heating (thermal conditioning) of the preforms and a blow-molding installation with at least one blow-molding station, in the area of which the in each case previously tempered preform is expanded biaxially or multiaxially into a container. The expansion occurs with the help of a compressed gas (compressed air) as the pressure medium which is introduced in the preform to be expanded by means of a molding pressure. The process-engineering procedure for a preform expansion such as this is explained in DE-OS 43 40 291.

The basic structure of the blow-molding station is described in DE-OS 42 12 583. Options for tempering the preforms are explained in DE-OS 23 52 926.

According to a typical further processing method, the containers made by blow-molding are supplied to a subsequent filling installation and here are filled with the planned product or filling material. Thus, a separate blow-molding machine and a separate filling machine are used. Also known, furthermore, is combining the separate blow-molding machine and the separate filling machine to form one machine block, i.e. to form a blocked blow-molding and filling installation, wherein moreover the blow-molding and the filling take place on separate machine components and chronologically consecutively.

It has furthermore already been proposed to produce containers, in particular also in the form of bottles made of thermally conditioned or pre-heated preforms and moreover at the same time to fill them with a liquid filling material, which is supplied as a hydraulic pressure medium to expand the preform and to mold the container with a molding and filling pressure, so that the particular preform is shaped into the container at the same time as the filling. Certain problems with methods of this kind are that the contamination of the particular molding and filling station or the mold forming this station, which is made similar to a blow-mold of a blow-molding machine for producing containers made of thermally conditioned preforms by blowing with a compressed gas, need to be avoided. Especially in the case of a full or partial carbonation of the filling material, there is to a particular degree the danger of a contamination of the particular molding and filling station by filling material losses, in particular at the lowering of the internal pressure of the container, i.e. when depressurising the container from the very high molding and filling pressure to the ambient pressure. Filling material losses of this kind are caused in particular by a massive formation of foam at depressurisation, so that the simultaneous molding and filling of containers could hitherto not be used where preforms were used and where the filling material was used as a pressure medium (hydraulic molding technology), in particular for products containing $CO_2$.

Moreover, at the end of the particular molding and filling process, filling material necessarily remains on and in the molding and filling elements. This filling material drips off at least partially and/or, due to air movement, spreads inside the molds of the molding and filling stations and thereby contaminates in particular also critical surfaces, i.e. surfaces which, during molding and filling, come into contact with the filling material and/or with areas of the containers close to the filling material and/or touching the filling material, so that due to microbial growth on the surfaces contaminated with the filling material, a microbiological risk to the filling material and also to people, in particular service personnel, arises.

SUMMARY OF THE INVENTION

The purpose of the invention is to disclose a method which reliably avoids the contamination of the mold of the particular molding and filling station at least during the normal molding and filling operation.

In the method according to the invention, before the end of a molding and filling process, i.e. before the particular filled container is removed and possibly before the final depressurisation of the filled container, the operating status of the molding and filling station is changed from a molding and filling status in which the molding and filling of the containers takes place, to a safety status in which the molding and filling element or the part of the molding and filling element interacting with the particular preform and then with the container being molded and serving to introduce the filling material and to mold the container is outside the mold, at least outside a part of the mold which serves for molding critical areas of the containers, i.e. for molding the container mouth and immediately adjacent container areas.

Only after the transfer of another preform to the molding and filling position for a further molding and filling process is the particular molding and filling station reset to its molding and filling status. Hereby achieved is that during the normal molding and filling operation, at no point is a molding and filling element not occupied by a preform or container in the inner space of a mold or extending into this inner space and thus inter alia also no filling material residue remaining on the molding and filling element after the filling and molding of a container or released at the final release of the containers, can get into the molds or their inner spaces.

In a preferred embodiment, in addition, means are provided for cleaning and/or sterilising or disinfecting the molding and filling stations and their molds, whereby this cleaning and sterilising or disinfecting occurs either periodically in an independent cleaning and sterilisation or disinfection operation, or however is carried out with the molding and filling stations in each case in the safety status, e.g. also during the running molding and filling process.

By "areas close to the filling material" in the meaning of the invention are meant areas or surfaces of the molding and filling station which come directly into contact with the filling material, i.e. in particular areas conveying the filling material, but also areas or surfaces which come into contact with areas, in particular also with the edge of the opening and the inner surface of the preforms and the containers being molded, and/or extend into the preform or the containers being molded during the molding and filling process.

"Areas close to the filling material" are however, in the meaning of the invention, also the areas of the preforms or containers which, during the molding and filling and/or thereafter, are in connection with the filling material, thus inter alia also the container mouth and container areas directly adjacent to it.

In the meaning of the invention, the expression "substantially" or "approximately" means deviations from the exact value in each case by +/−10%, and preferably by +/−5% and/or deviations in the form of changes not significant for function.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

BRIEF DESCRIPTION OF THE DRAWING

The invention is explained in more detail below by means of the figures using an example of an embodiment. The following are shown.

DETAILED DESCRIPTION OF THE INVENTION

The device generally designated by 1 in FIGS. 1-4 serves for the production of filled containers 2 in the form of bottles using preforms 3 made of a thermoplastic material, for example polyethyleneterephthalate (PET), polyethylene (PEE), polyethylene naphthalate (PEN) or polypropylene (PP). The preforms 3 are made, in the known manner, sleeve-like with one open end forming the subsequent container mouth, and with one closed base forming the subsequent container base, and also with a flange forming the subsequent mouth flange of the containers 2 (see too FIG. 5).

The production of the containers 2, filled with the liquid filling material, is carried out basically in such a way that the in each case conditioned preform 3, i.e. at least pre-heated and disposed in a molding and filling station 4 or in the inner space of a closed mold 5 in said station, is impacted by the filling material which is under a high molding and filling pressure and for example heated for a hot-sterile filling, so that the preform 3 in a molding and filling process is deformed hydraulically by this filling material into the particular container 2 and moreover the container 2 is at the same time filled. Each container 2 molded and filled in this way is then, after its depressurisation from the molding and filling pressure to ambient pressure and after its removal from the mold 5, is closed in an appropriate manner.

To carry out the molding and filling process, the device 1 has, on a rotatably driven transport element in the form of a rotor 6 which can be driven around a vertical machine axis MA (arrow A), a plurality of molding and filling stations 4, which are provided offset from each other at the same radial distance from the machine axis MA and at equal angular distances around this axis. Each molding and filling station 4 comprises, in addition to its mold, a molding and filling element 7, arranged above this mold in the illustrated embodiment, whereby said element extends into the closed mold 5, at least during the particular molding and filling process, with a filling element section or molding and filling head 8, and against said element the particular preform 3 or the container 2 being molded, lies with its open end in a sealed position, held on the mouth flange by holding means 7.1.

Figure 1:
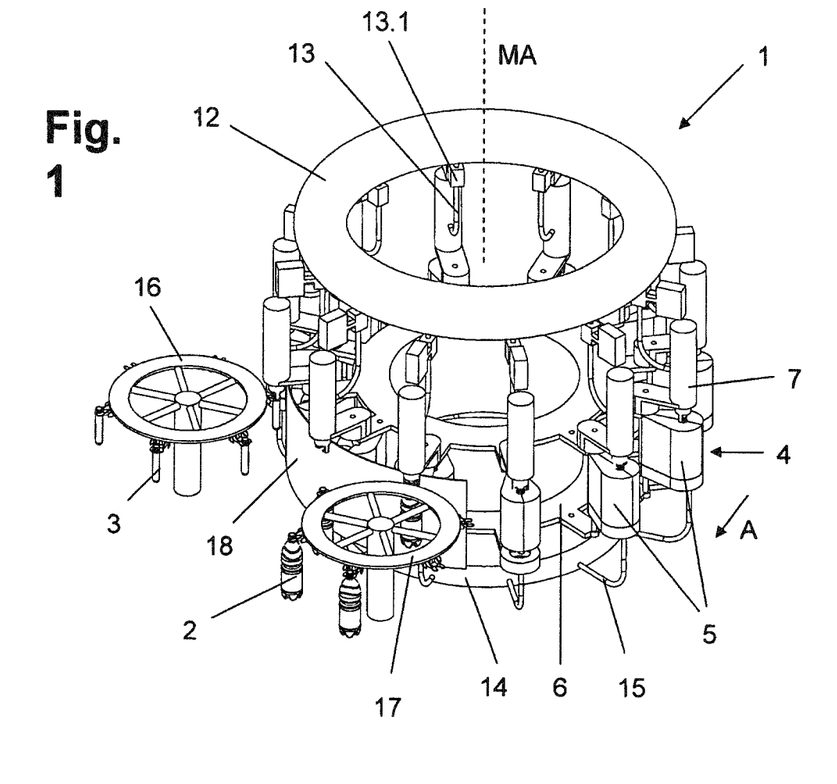
FIG. 1 in a simplified perspective representation, a machine or device of a rotary design for producing filled containers.
Figure 2:
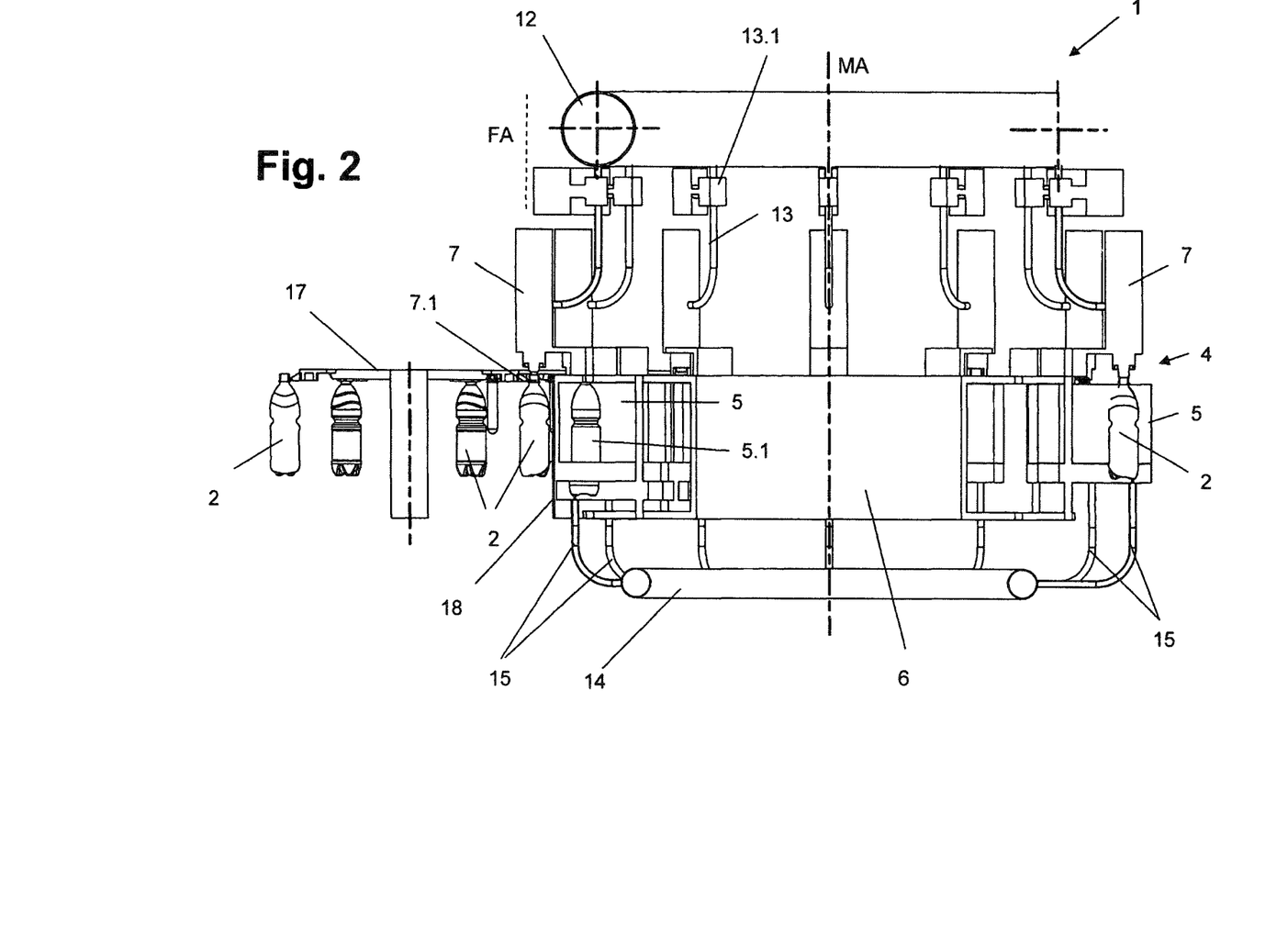
FIG. 2 in a schematic representation, a vertical section through the device in FIG. 1.
Figure 3:
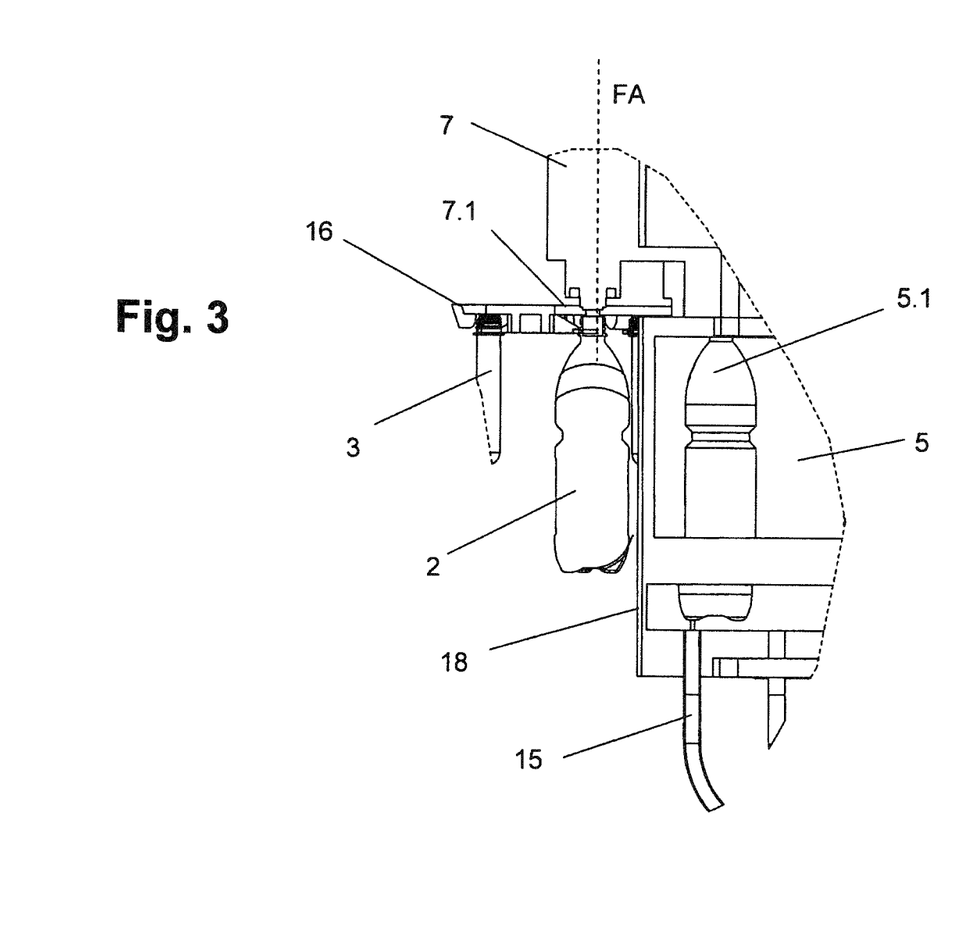
FIG. 3 a magnified partial representation of FIG. 2.
Figure 4:
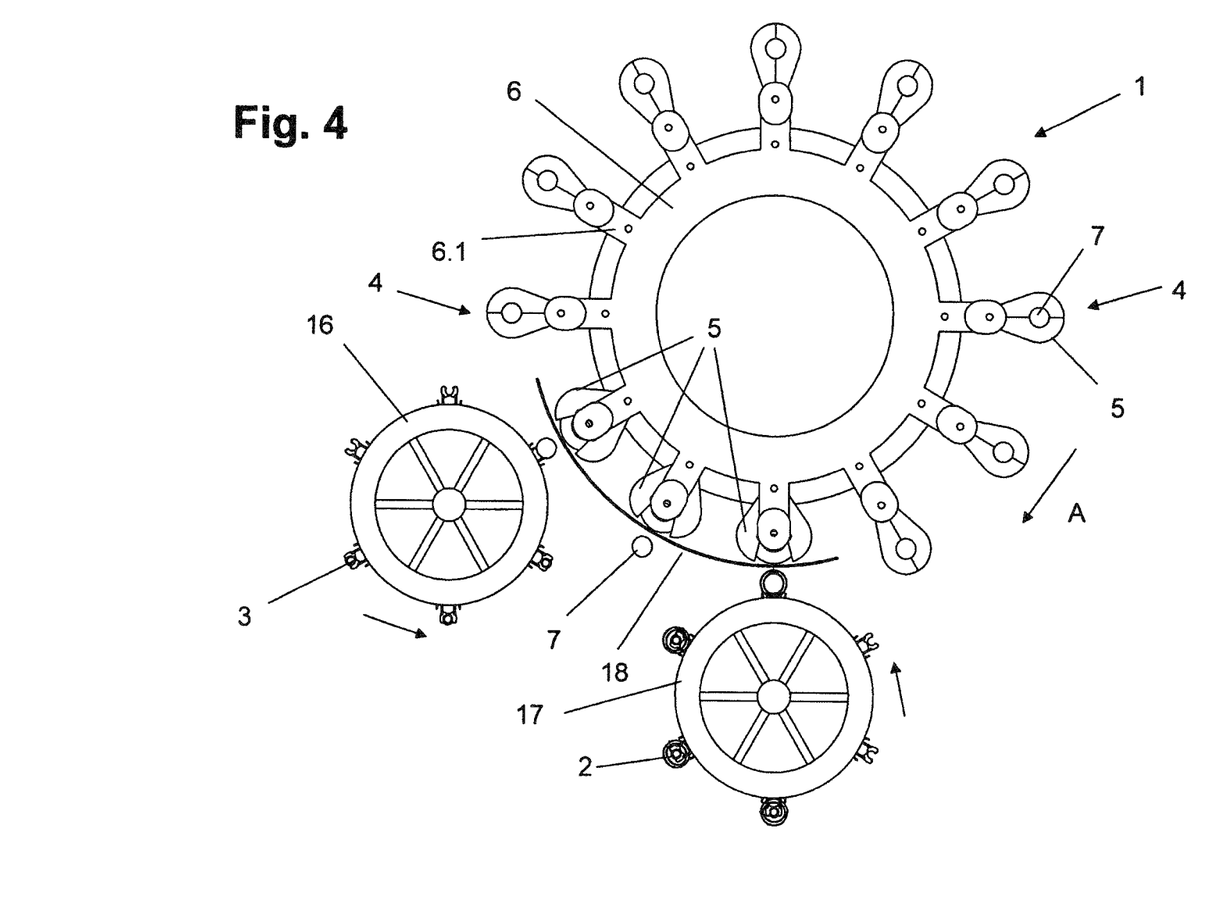
FIG. 4 in a schematic representation, a plan view of the device in FIGS. 1-3.
Figure 5:
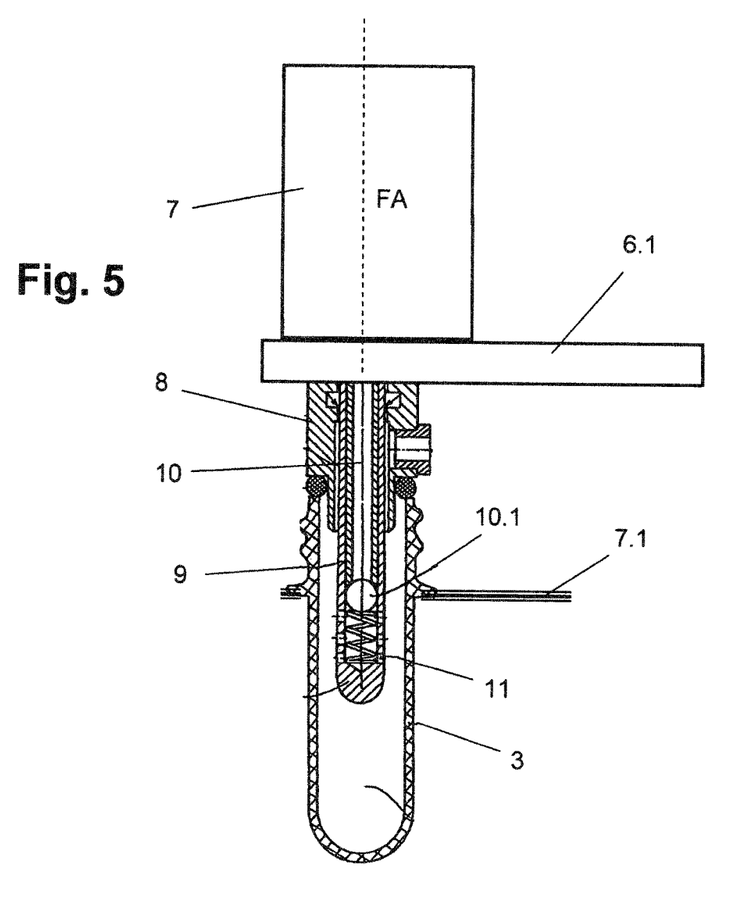
FIG. 5 in a simplified schematic partial representation, one of the molding and filling elements of the device in FIGS. 1-4.

In the molding and filling head 8, in a vertical direction, i.e. in the direction of a molding and filling element axis FA, a stretching rod 9 is provided which can be axially displaced, and which is moved downwards in a controlled manner with its lower rounded end in FIG. 5, during the molding and filling process, at least intermittently initially lying against the base of the relevant preform 3 and then against the base of the container 2 being molded, and thus controls the deforming or stretching of the preform 3 into the particular container 2 in the axis FA. In the illustrated embodiment, the introduction of the liquid filling material into the preform 3 or into the increasingly molded container 2 also takes place by means of a liquid channel 10 which is formed in the stretching rod and opens at the openings 11 in the area of the lower end of the stretching rod. In the liquid channel 10, before the openings 11, a check valve 10.1 is arranged with which a dry running of the liquid channel 10 is avoided after the end of the molding and filling process.

On the rotor 6, an annular tank 12 is provided which during the molding and filling operation of the device 1, is at least partially filled with the filling material under molding and filling pressure and is connected to the molding and filling elements 7 by means of pipes which have control valves 13.1. Underneath the molding and filling stations 4, on the rotor 6, an annular tank 14 is provided which serves inter alia as a collector tank or container for the collection of filling material residues, which have got into the mold 5 for example due to defective preforms 3 and/or due to the bursting of containers 2 during the molding and filling process, and of liquid cleaning agents and disinfectants during the cleaning and/or disinfection of the molding and filling stations 4 or of the molds 5 or during a cleaning and disinfection operation of the device 1. The molds 5 are connected to the annular tank 14 by means of preferably flexible pipes 15.

In the illustrated embodiment, the preforms 3 are supplied to the individual molding and filling stations 4 by means of a transport star 16. The filled containers 2 are removed from the molds 5, opened again after the molding and filling, by means of a transport star 17.

As explained, after the particular molding and filling process, filling material necessarily remains on the molding and filling elements 7, in particular in and on their molding and filling heads 8 and on the stretching rod 9. Furthermore, filling material emerging when the filled containers 2 are depressurised can basically also not be avoided. These filling material residues also lead, due to air movements, to an internal and external contamination of the molds 5 with filling material, this being with the danger of microbial growth on the filling material residues on the inside and outside of the molds and a microbiological hazard for the filling material filled into the containers 2 and/or also for people, for example the service personnel of the device 1. To avoid this, the molding and filling stations 4 of the device 1 are made in such a way, in the manner described in more detail below, that the operating status of each molding and filling station 4 can be changed in a controlled manner between a molding and filling status during the molding and filling process and a safety status.

For this change of operating status, the mold 5 of each molding and filling station 4 is moveable relative to the associated molding and filling element 7 and the associated holder 7.1, being in the illustrated embodiment radial to the machine axis MA between a molding and filling position which is radially external in relation to this axis, said position corresponding to the molding and filling status and in said position the particular molding and filling element 7 extending, at least by its filling and molding head 8, into the inner space 5.1 of the associated mold 5, and a park position which radially further inwards in relation to the machine axis MA, which corresponds to the safety status and in which the mold 5 is moved radially inwards in relation to the associated molding and filling element 7 or the vertical axis FA of this element, and in relation to the holder 7.1, until at least the critical areas of the molding and filling element 7 and the holder 7.1, which during the molding and filling process come into contact with the filling material introduced into the preforms 3 or into the containers 2 being formed and/or on which filling material residues remain after removal of the filled containers 2, are clearly outside the inner space 5.1 of the associated mold 5. These critical areas are in particular also the area of the filling and molding head 8 forming the particular discharge opening for the filling material, i.e. in the illustrated embodiment the openings 11, and the stretching rod 9. In contrast to the molds 5, the molding and filling elements 7 and their holders 7.1 are provided fixed on the rotor 6 or on in each case a rotor section or boom 6.1.

The movement of the molds 5 between their molding and filling position and the park position is controlled depending on the rotary movement or rotary position of the rotor 6, for example by corresponding control cams, not illustrated, this being in such a way that every preform 3 is transferred by means of the transport star 16 to a molding and filling station 4 which is in the park position, and then, with the associated holder 7.1, is pressed in a sealed position against the filling and molding head. Only following this, is the associated open mold 5 moved into the molding and filling position and moreover the preform introduced into this mold, so that then on the following angle range of the rotary movement of the rotor 6, with the mold 5 closed, the molding and filling of the particular container can take place. Shortly before the particular molding and filling station 4 reaches the container outlet formed by the transport star 17 due to the rotary movement of the rotor 6, the particular mold 5 is opened and moved from its molding and filling position back into the park position. The filled container initially still remains in a sealed position on the molding and filling element 7. Only upon reaching the container outlet is the filled container 2 removed from the molding and filling element 7 and the holder 7.1, and moved away by means of the transport star 17. Any filling material residues sticking to the particular molding and filling element 7 can drip onto the angle range of the rotary movement of the rotor 6 between the container outlet formed by the transport star 17 and the preform transfer formed by the transport star 16, this being until a preform 3 is once again positioned on the molding and filling element 7. In any event, at no point in the molding and filling operation of the device 1 is there a situation in which molding and filling elements 7 not occupied by preforms 3 or by containers 2 are inside the mold 5 of the associated molding and filling station 4 or extend into it and in which contamination of the mold or inner space 5.1 of the molds 5 by the filling material could therefore occur after the removal of the particular filled container.

To avoid contamination of the open molds 5 by filling material on the angle range of the rotary movement of the rotor 6 between the container outlet and the preform transfer, a protective device in the form of a dividing panel or a wall 18 is provided on this angle range of the rotary movement of the rotor 6. The wall 18 is arranged curved in an arc around the machine axis MA so that the path of movement of the molds 5 in the park position runs along the concave side of the wall 18 facing the machine axis MA and the path of movement of the molding and filling elements 7 and the holder 7.1 runs along the convex side of the wall 18 facing away from the machine axis MA. Instead of or additionally to the wall 18, a "curtain" formed by a current of a gas and/or vapour medium can also be provided as protection.

The invention has been described above using an example of an embodiment. It is clear that modifications and variations are possible without thereby departing from the inventive idea underlying the invention. It is thus assumed above that the molds 5 are moved between the molding and filling position and the park position relative to their associated molding and filling elements 7. Although this embodiment from the structural viewpoint represents a particularly expedient and favourable solution, it is also possible, to achieve the aforesaid advantages, to provide the molds 5 fixed on the rotor or on another rotary transport element and to move the molding and filling elements 7 together with their holders 7.1 between a molding and filling position and a park position.

Furthermore, above it is assumed that the movement between the molding and filling position and the park position occurs radially to the machine axis MA. Movements in other directions or of another type, for example swivel movements, are also possible.

Furthermore, above it is assumed that in the event of a movement of the molds 5 between the molding and filling position and the park position, the entire mold is moved in each case. In the event of a multi-part design of the molds 5, it can also be sufficient for only those parts of these molds 5 which serve to mold areas of containers close to the filling material, to be designed for a movement between the molding and filling position and the park position.

REFERENCE SYMBOL LIST 1, 1a Device
2 Container
3 Preform
4 Molding and filling station
5 Mold
5.1 Inner space
6 Rotor
6.1-6.3 Rotor section
7 Molding and filling element
7.1 Holder
8 Molding and filling head
9 Stretching rod
10 Liquid channel
10.1 Check valve
11 Opening
12 Annular tank
13 Pipe
13.1 Control valve 14 Annular tank
15 Pipe
16, 17 Transport star
18 Protective device or wall
A Direction of rotation, rotor 6
FA Vertical axis of the molding and filling element 7
MA Vertical machine axis

The invention claimed is:

1. A method for producing filled containers from preforms made of a thermoplastic material, comprising the steps of: transferring the preforms in each case onto a molding and filling element of a molding and filling station; and, in a subsequent molding and filling process, remolding the preforms into a particular container in a mold of the molding and filling station, which is in a molding and filling status in which a simultaneous molding and of the container is carried out under an effect of pressure of a supplied liquid filling material; and, after the molding and filling, removing the container from the molding and filling element of the molding and filling station; further including, before the molded and filled container is removed, transferring the molding and filling station into a safety status in which the particular mold is separated and protected from the molding and filling element, wherein there is a plurality of molding and filling stations on a transport element which is driven in a rotary manner, the switching of the molding and filling stations between the molding and filling status and the safety status occurs by a relative movement between the particular molding and filling element and an associated mold, the relative movement being radial to an axis of rotation of the rotating transport element so that in the safety status the particular mold is entirely radially spaced from the molding and filling element so that there is no radial overlap between the molding and filling element and the mold.

2. The method according to claim 1, wherein, in the safety status, the molding and filling station whose molding and filling element or at least such areas of the molding and filling element which come into contact with the filling material and with the preforms or the containers being molded during the molding and filling, are kept apart from the inner space of an associated mold or a partial area of the mold forming at least the container mouth.

3. The method according to claim 1, wherein, after an end of the particular molding and filling process, the safety status of the molding and filling station is maintained until a perform is once again transferred onto the molding and filling station or the molding and filling element.

4. The method according to claim 1, wherein switching of the molding and filling station between the molding and filling status and the safety status occurs by relative movement between the molding and filling element or a part of the molding and filling element and an associated mold or a part of the mold.

5. The method according to claim 4, wherein the relative movement is a linear movement in at least one axial direction and/or a swivel movement.

6. The method according to claim 4, wherein, there is a plurality of molding and filling stations on a transport element which can be driven in a rotary manner, the switching of the molding and filling stations from the molding and filling status to the safety status occurs in each case before the containers reach a container outlet at which filled containers are taken from the molding and filling stations, and return of the molding and filling stations to the molding and filling status occurs after passage of an inlet at which the preforms are transferred to the molding and filling stations.

7. The method according to claim 1, wherein a particular preform or the container being molded from the particular preform are guided at least intermittently by a stretching rod and/or stretched in an axial direction.

8. The method according to claim 7, wherein the preform or the container is stretched in an axial direction corresponding to the axis of the containers.

9. The method according to claim 1, including, in the safety status of the molding and filling stations, providing a barrier between the associated mold or a part of the mold and the particular molding and filling element, the barrier extending over an angular range of the rotary movement Of the rotating transport element.

10. A device for producing containers filled with a liquid filling material from preforms made of a thermoplastic material, the device comprising: a plurality of molding and filling stations having a mold and a molding and filling element, the molding and filling stations being arranged on a transport element driven in a rotating manner, wherein each molding and filling station has at least one molding and filling element by which, during the molding and filling, the liquid filling material is introduced into a particular preform and simultaneously into the container being molded so that the preform is simultaneously molded and filled with the liquid filling material, and at least one mold with a mold inner space having a contour that corresponds to a shape of the containers, wherein the molding and filling element interacting with the preform and the container during the molding and filling, and the mold are movable relative to one another in a radial direction with respect to an axis of rotation of the transport element to change a status of the molding and filling station between a molding and filling status and a safety status, in which the molding and filling element is entirely radially separated from the mold, wherein a switching of the molding and filling stations between the molding and filling status and the safety status occurs by a relative movement between the particular molding and filling element and an associated mold in a direction radial to the axis of rotation of the rotating transport element so that there is no radial overlap between the molding and filling element and the mold.

11. The device according to claim 10, wherein the relative movement is at least one movement component in an axial direction and/or a swivel movement around at least one axis.

12. The device according to claim 11, wherein the mold of the particular molding and filling station or a part of the mold and/or the molding and filling element or a part of the molding and filling element is movable radially to a machine axis between a molding and filling position corresponding to the molding and filling status and a park position corresponding to the safety status.

13. The device according to claim 12, wherein, between a movement path corresponding to the park position of the molds or the molding and filling elements, and a movement path corresponding to the molding and filling position of the molding and filling elements or the molds in a transport direction of the transport element, a protective device is provided between a container outlet and an inlet for the preforms.

14. The device according to claim 13, wherein the protective device is a protective wall and/or a curtain comprising a current of a gas and/or vapor medium.

15. The device according to claim 10, further comprising means for cleaning and/or sterilizing the particular mold in the safety status of the at least one molding and filling station.

16. The device according to claim 15, wherein the means for cleaning and/or sterilizing are designed to apply at least a liquid cleaning agent and/or disinfectant and/or a vapor and/or gas medium on inner and outer surfaces of the at least one molding and filling station and/or the mold.

17. The device according to claim 10, wherein the at least one mold is a multi-part mold with at least two mold parts forming a lateral surface of the containers and with at least one mold part forming a container base.

18. The device according to claim 17, with at least two pincer-like mold parts jointed to each other and forming the lateral surface of the containers.

19. A device according to claim 10, further comprising a barrier arranged between the associated mold or a part of the mold and the particular molding and filling element in the safety status of the molding and filling stations, the barrier extending over an angular range of rotary movement of the rotating transport element.

* * * * *